United States Patent [19]
Patton et al.

[11] Patent Number: 5,934,777
[45] Date of Patent: Aug. 10, 1999

[54] METHOD FOR SEQUENCING FILM IMAGE PRESENTATIONS AND FILM IMAGE SEQUENCER

[75] Inventors: David L. Patton, Webster; Daniel M. Pagano, Henrietta; Dale F. McIntyre, Honeoye Falls; Edward Weissberger, Pittsford, all of N.Y.

[73] Assignee: Eastman Kodak Company, Rochester, N.Y.

[21] Appl. No.: 08/854,022

[22] Filed: May 8, 1997

[51] Int. Cl.⁶ .................................................. G03B 21/14
[52] U.S. Cl. ............................ 353/25; 353/121; 353/27 A
[58] Field of Search ..................................... 353/25, 26 A, 353/27 A, 27 R, 26 R, 21, 121, 122

[56] References Cited

U.S. PATENT DOCUMENTS

| | | | |
|---|---|---|---|
| 3,551,042 | 12/1970 | Brink et al. . | |
| 3,868,645 | 2/1975 | Delplanque et al. | 353/25 |
| 4,005,530 | 2/1977 | Takahashi et al. . | |
| 4,363,055 | 12/1982 | Lee | 353/26 A |
| 4,385,814 | 5/1983 | Elliott | 352/92 |
| 4,452,518 | 6/1984 | Digianfilippo et al. | 353/25 |
| 4,568,161 | 2/1986 | DiGianfilippo et al. | 353/25 |
| 4,616,926 | 10/1986 | DiPietro et al. | 355/45 |
| 4,765,734 | 8/1988 | Truc et al. | 353/121 |
| 5,424,790 | 6/1995 | Tsunefuji et al. | 353/26 A |
| 5,428,417 | 6/1995 | Lichtenstein | 353/122 |
| 5,436,682 | 7/1995 | Katoh et al. | 353/15 |
| 5,526,011 | 6/1996 | Hix et al. | 353/122 |
| 5,532,773 | 7/1996 | Shaw et al. | 353/26 A |
| 5,541,644 | 7/1996 | Nanba | 348/96 |
| 5,609,403 | 3/1997 | Bell et al. | 353/25 |
| 5,623,710 | 4/1997 | Ogawa | 396/300 |
| 5,702,169 | 12/1997 | Nishimura | 353/26 A |
| 5,706,097 | 1/1998 | Schelling et al. . | |

*Primary Examiner*—William Dowling
*Attorney, Agent, or Firm*—Robert Luke Walker

[57] ABSTRACT

A method and apparatus for sequencing film image presentations. In the method, a film unit is first provided. The film unit has a digital memory store and a plurality of image frames. An index print is provided. The index print has an array of imagettes corresponding to the image frames of the film unit. The index print is then aligned with an array of switches, such that at least one switch is in registry with each imagette. The switches are then allocated to an array of triggers. The triggers each have a uniquely associated imagette. The triggers each include at least one switch in registry with the imagette. The array of triggers has at least one trigger associated with each of imagette. A plurality of the switches are then actuated in a non-predetermined sequence to define a sequence of imagettes associated with respective triggers. A sequence of image frames corresponding to the sequence of imagettes is recorded in the digital memory store.

24 Claims, 9 Drawing Sheets

METHOD FOR SEQUENCING FILM IMAGE PRESENTATIONS AND FILM IMAGE SEQUENCER

CROSS REFERENCE TO RELATED APPLICATIONS

This application is related to the following application filed concurrently herewith:

"Method for Transferring a Recording From a Sound Index Print and Player-Transfer Apparatus" of David L. Patton (Attorney Docket No. 74669RLW).

FIELD OF THE INVENTION

The invention relates to apparatus and methods for sequencing, editing, and employing a predetermined sequence of individual film image projections. The invention more particularly relates to an improved film image sequencer and sequencing methods.

BACKGROUND OF THE INVENTION

The invention is concerned with the preparation of a presentation of transmitted light viewable images provided in a film unit. The terms "transmitted light viewable image" and "image frame" are used here to refer to a segment of processed photographic film, positive or negative; or a segment of imprinted transparency material; which bears optical information, i.e., an image, that can be accessed or viewed by transmitting light through the segment. The term "film unit" is used here to refer to an assemblage of image frames and associated material and structures that hold the image frames in the assemblage. The term "film unit" is thus inclusive of a strip of processed film; a film canister with a strip of permanently attached, but extractable processed film; and a slide tray loaded with mounted slides. The term "presentation" is used here to refer to the sequential projection of a series of image frames either for display on an internal or external screen or for other utilization, such as film scanning and digitization.

A variety of methods and apparatus have been used for sequencing, editing, and employing image frames. These methods and apparatus have presented continuing difficulties in providing a presentation sequence for image frames. The commonest approach has been to physically order discrete image frames, e.g. slides, within a slide tray. This approach is simple and relatively free from errors, but generally inflexible. For example, the use of an alternative presentation sequence requires either rework or a duplicate set of slides. This approach is also unsuitable for varying the presentation sequence of a filmstrip. The order of presentation of image frames on a filmstrip is ordinarily determined by the positions of the image frames on the filmstrip. This order can be varied by the user when the images are employed. Computerized control devices used with slide or filmstrip projectors or the like allow the presentation order of the images to be varied from the physical order provided by a film unit. A varied order for the display of slides or the like can also be preprogrammed into a computerized control device by typing in a series of numbers representing the different image frames or pressing appropriately labeled buttons in a desired order. The images provided by the individual image frames can also be manipulated in a variety of ways, either at the time of use or by preprogramming. These approaches are all workable, but remain cumbersome.

The following are specific examples of the above approaches. U.S. Pat. No. 3,551,042 discloses an apparatus that includes a series of projectors that simultaneously project a plurality of image frames. The projected images can be adjusted for position, scale, orientation, and brightness, by use of control elements including pushbuttons and joysticks. Image frames for display can be selected by use of controls for the individual projectors. U.S. Pat. No. 5,428,417 discloses an apparatus in which a touch panel is used to control a slide projector and digital overlay graphics projector. A portion of the touch panel serves as a scaled down version of the projection screen to simplify positioning of icons and other graphics. U.S. Pat. No. 5,526,011 discloses a system for preparing presentations from "electronic transparencies", i.e. digital images. U.S. Pat. No. 4,765,734 discloses a system in which images are projected onto a video imager for video output. The system can crop the projected image and invert the colors of the video output. The slides have a magnetically recordable strip and the system includes magnetic heads for reading from and writing to the slides. Settings for cropping and color can be recorded on the slides. The video output can also display information recorded on the slides. A keyboard and joysticks are used to enter information into the system. U.S. Pat. No. 5,424,790 discloses a projection apparatus that works with processed film in a film canister and automatically adjusts luminance. U.S. Pat. No. 5,541,644 discloses another projection apparatus that uses a film canister. Image manipulation information can be recorded on a magnetic layer of the film. U.S. Pat. No. 5,436,682 discloses an apparatus that projects a film image onto a video input device and then displays the resulting video image. The apparatus has controls for zooming, panning, and white and color balance. Settings can be recorded on a magnetically recordable portion of film in a film cartridge. U.S. Pat. No. 4,363,055 discloses a projector control system that allows a user to select a particular filmstrip frame by typing in a number on a keypad. A digital display is provided adjacent the keypad. U.S. Pat. Nos. 4,568,161 and 4,385,814 disclose computerized slide projector controllers. U.S. Pat. No. 4,616,926 discloses an apparatus that includes a projector that can orient, magnify, and compose a projected image. U.S. Pat. No. 4,005,530 discloses an audio-video training device with selective branching, in which answers to questions determine the order in which a slide projector advances from image frame to image frame. U.S. patent application Ser. No. 08/796,323, entitled "IMAGE-AUDIO PRINT, METHOD OF MAKING AND PLAYER FOR USING", filed Feb. 7, 1997 by C. S. Bell et al, which is hereby incorporated herein by reference; discloses single image prints and index prints which include audio data storage means for each image. The application also discloses a player that receives the index print in a predetermined location. The player has a touchscreen that is positioned to overlie the print. Touching the touchscreen over an image actuates audible playback of audio data for that image. The player includes a memory into which any of the audio data can be conveyed and from which audio data can be moved into other prints or other positions on the same print.

It is now a common practice for film processors to return photographic prints and negatives with an index print. The index print has an array of imagettes that correspond to the image frames of the processed film. The imagettes are miniature positive prints that allow the user to more easily classify sets of photos, select negatives for additional processing and the like. Index prints can be provided with numbers corresponding to numbers adjoining respective image frames on negative filmstrip segments. With Advanced Photo System™ (APS™) films, the processed filmstrip is not cut into segments, but instead is retained in the original film cartridge. The cartridge and index print both bear unique human and machine readable identifiers.

It is desirable to methods and apparatus that use an index print to provide for easy sequencing of image frames for presentations. It is also desirable to provide methods and apparatus that allow easy preparation of multiple preparations for a single film unit. It is also desirable that methods and apparatus be provided that allow sequencing of image frames without requiring viewing or other accessing of the image frames of a film unit.

SUMMARY OF THE INVENTION

The invention is defined by the claims. The invention, in its broader aspects, provides a method and apparatus for sequencing film image presentations. In the method, a film unit is first provided. The film unit has a digital memory store and a plurality of image frames. An index print is provided. The index print has an array of imagettes corresponding to the image frames of the film unit. The index print is then aligned with an array of switches, such that at least one switch is in registry with each imagette. The switches are then allocated to an array of triggers. The triggers each have a uniquely associated imagette. The triggers each include at least one switch in registry with the imagette. The array of triggers has at least one trigger associated with each imagette. A plurality of the switches are then actuated in a non-predetermined sequence to define a sequence of imagettes associated with respective triggers. A sequence of image frames corresponding to the sequence of imagettes is recorded in the digital memory store.

It is an advantageous effect of at least some of the embodiments of the invention to provide methods and apparatus that use an index print to provide for easy sequencing of image frames for presentations. It is an advantageous effect of at least some of the embodiments of the invention to provide methods and apparatus that allow easy preparation of multiple preparations for a single film unit. It is an advantageous effect of at least some of the embodiments of the invention to provide methods and apparatus that allow sequencing of image frames without requiring viewing or other accessing of the image frames of a film unit.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The film image sequencer of the invention provides a convenient way to sequence film image frame presentations. The presentations can be for human viewing, i.e., slide shows or the like; or can be sequences of projections of film image frames to a mechanical device, such as the scanning element of a digital film scanner. The film image sequencer can include features that allow the images projected by the image frames to be edited prior to the presentation. Editing can, for example, change orientation, zoom, or crop the original image. This has very clear usefulness for slide shows, but it is also useful for digital scanning and the like, since this editing can greatly reduce scanning time.

Figure 1:
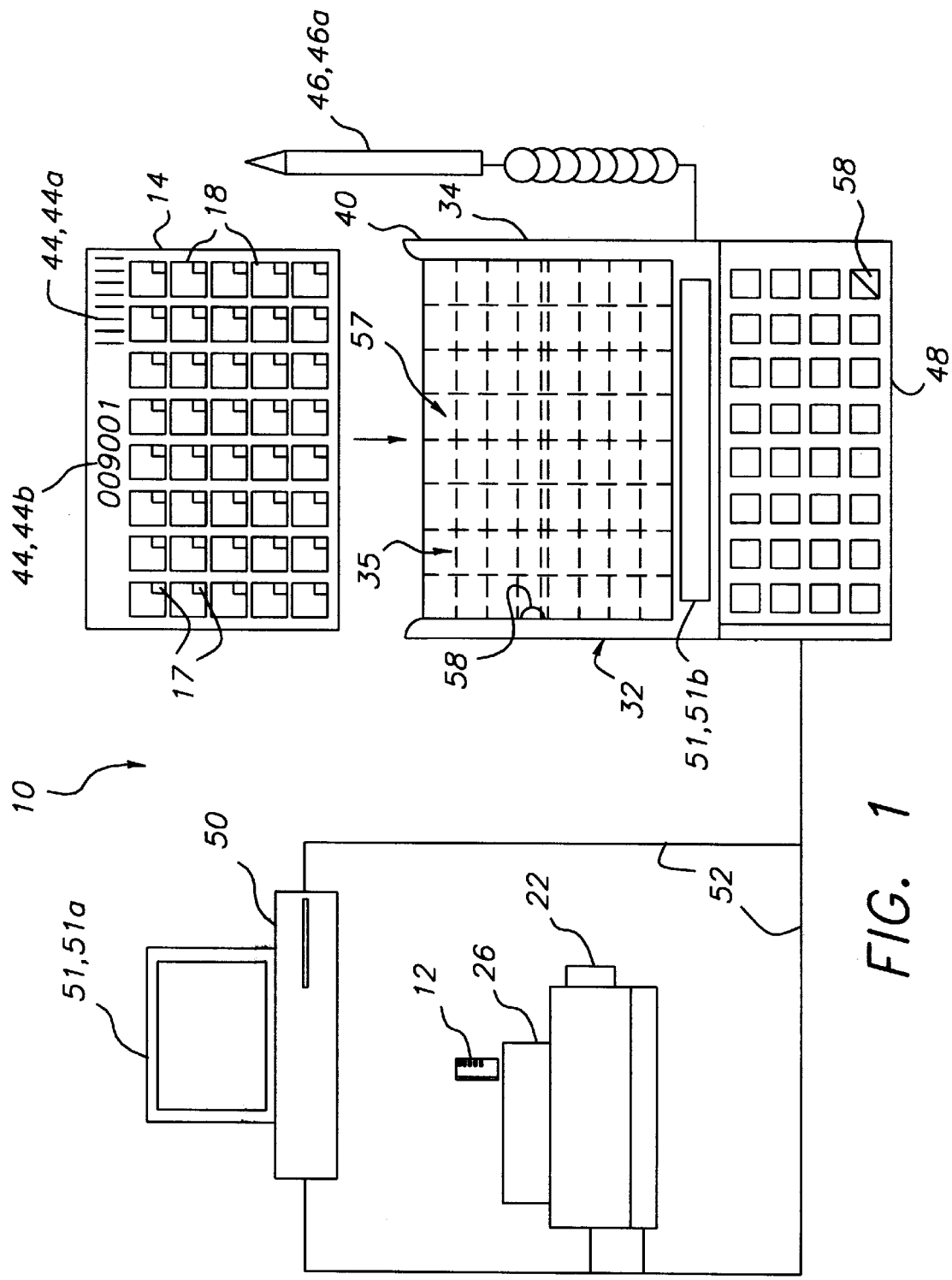
FIG. 1 is a semi-diagrammatical view of an embodiment of the apparatus of the invention and an index print and film unit. The direction of index print loading is indicated by an arrow.
Figure 2:
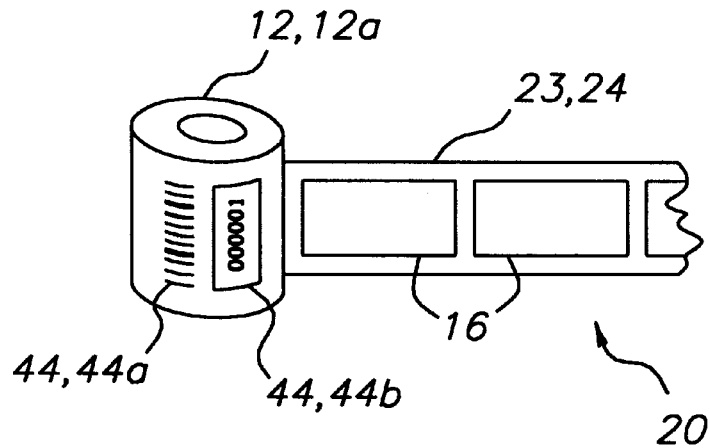
FIG. 2 is a semi-diagrammatical view of the film unit holder-programmable film projector of FIG. 1.
Figure 3:
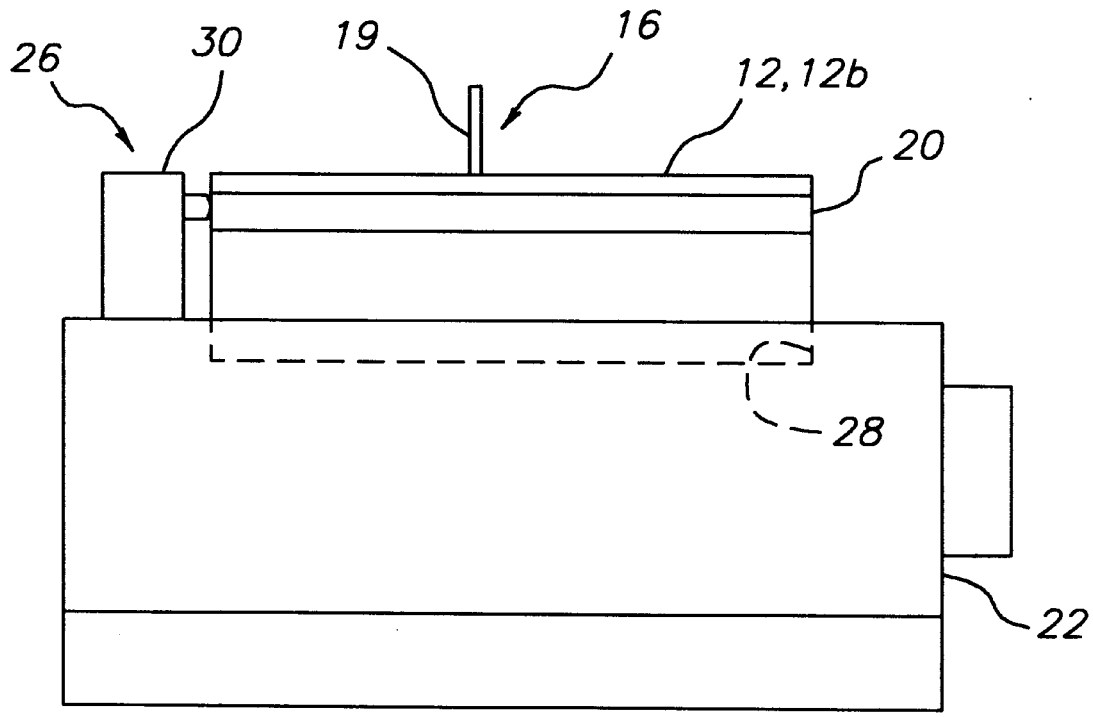
FIG. 3 is a perspective view of the film unit of another embodiment of the invention.

Referring now to FIGS. 1–3, the film image sequencer 10 of the invention uses a film unit 12 and an index print 14. The film unit 12 includes a plurality of image frames 16. The image frames 16 are associated with a plurality of imagettes 18 on the index print 14 corresponding to the image frames 16 of the film unit 12. The imagettes 18 present miniature representations of the image frames 16 and commonly are subject to a standardized modification for ease of viewing. For example, film negatives are commonly represented in index prints by positive images on photographic paper.

The invention is directed to use with associated index prints and film units; that is, film unit-index print sets in which the index print has imagettes corresponding to the image frames of the film unit. Index prints are commonly provided for processed films at the time of film processing and thus, at least initially, are also physically associated in some manner. Index prints can also be provided with numbers 17 corresponding to slide numbers or the numerical sequence of image frames on a filmstrip. An additional association is provided with Advanced Photo System™ (APS™) films. These films have thrust-type film cartridges. The processed filmstrip is permanently attached to a spool within a canister and can be thrust from the canister and wound completely back in, as required. With APS films the canister and index print both bear unique machine and human readable identifiers.

The film image sequencer 10 programs a presentation, a series of projections of image frames in a non-predetermined, i.e. user determined, sequence into the digital memory store 20 of a film unit 12 to provide a presentation programmed film unit. The term "digital memory store" is used here to refer to magnetic or optical media usable for machine recording and playback of digital information. In the film unit 12a of FIG. 2, the digital memory store 20 is a magnetically recordable layer of the photographic filmstrip 23. This kind of digital memory store is present in APS films. In the film unit 12b of FIG. 3, the image frames 16 are on segments of filmstrip mounted to provide individual slides 19, and the digital memory store 20 is a strip of magnetically recordable material attached to a slide tray 21. It is highly preferred that the media used in the film image sequencer be capable of playback immediately after recording. It is preferred that the media be rewriteable, that is, subject to erasure and re-recording. For reasons of cost, magnetic media is currently preferred over optical media. The digital memory store is capable of recording the sequence for at least one presentation of the image frames and is preferably capable of recording the sequences for multiple alternative presentations and a variety of additional information relating to the presentations.

After a presentation has been programmed on a film unit 12, the film unit 12 is used with the presentation device 22 to present the program of images. The presentation device 22 for use with a particular film unit 12, must be capable of reading and responding to the presentation data recorded in the digital image store 20 of the film unit 12. The image frames 16 of a film unit 12 must be accessible by a suitable presentation device 22 in any order. For example, image frames on processed film in a thrust type film cartridge can be accessed by thrusting the image frames into an appropriately configured projection frame (not shown) of the presentation device. The film can be unwound and rewound as needed to provide project image frames in a desired sequence. Slides can be accessed from a slide tray in a conventional manner, with tray movement substituting for the film unwinding and rewinding of the last example.

The film unit includes means for relating the image frame sequence information, and other optional editing information, to the physical image frames for the use of the programmable presentation device 22 (illustrated in FIG. 1 as a filmstrip projector). The image frame sequence and editing information, for example, can be associated with numbers representing the physical order of image frames in the film unit. Alternatively, each image frame can have an associated number or other identification in magnetic or optical form and the sequence and editing data can provide instructions based on those image frame identifications. Sequence and editing information can also be physically associated with individual image frames, although this is not preferred; since it is likely to cause unacceptable delays as the presentation device locates the image frames of a presentation.

Most characteristics of the film unit 16 are not critical to the invention. The image frames 16 can be permanently fixed to the support structure 24 of the film unit 12 or can be separable. The same applies to the digital memory store 20. Thus, as noted above, the film unit 12 can be a cartridge of processed film, that has a layer of magnetic media on the film, such as an APS™ cartridge. The film unit 12 can also be a slide tray that carries mounted slides and has a magnetic recording area on the tray or on the slides. It is desirable, however, that the film unit 12 provide at least a measure of integrity for the recorded presentation or presentations. In other words, it is desirable that the media of the digital image store 20 and image frames 16 be physically associated and not be readily separable. Separated media is more likely to get lost or damaged and, even if retained undamaged, cannot be readily re-associated. A desired minimal measure of inseparability is the use of a common support structure 24 for the digital image store and the image frames. A more desired measure of inseparability is the use of a film unit support structure that holds the image frames or digital image store, or preferably both in place and prevents thoughtless disassociation by the user. For example, processed APS film cartridges provide image frames and digital memory store that can remain permanently stored together in the film unit.

Figure 4:
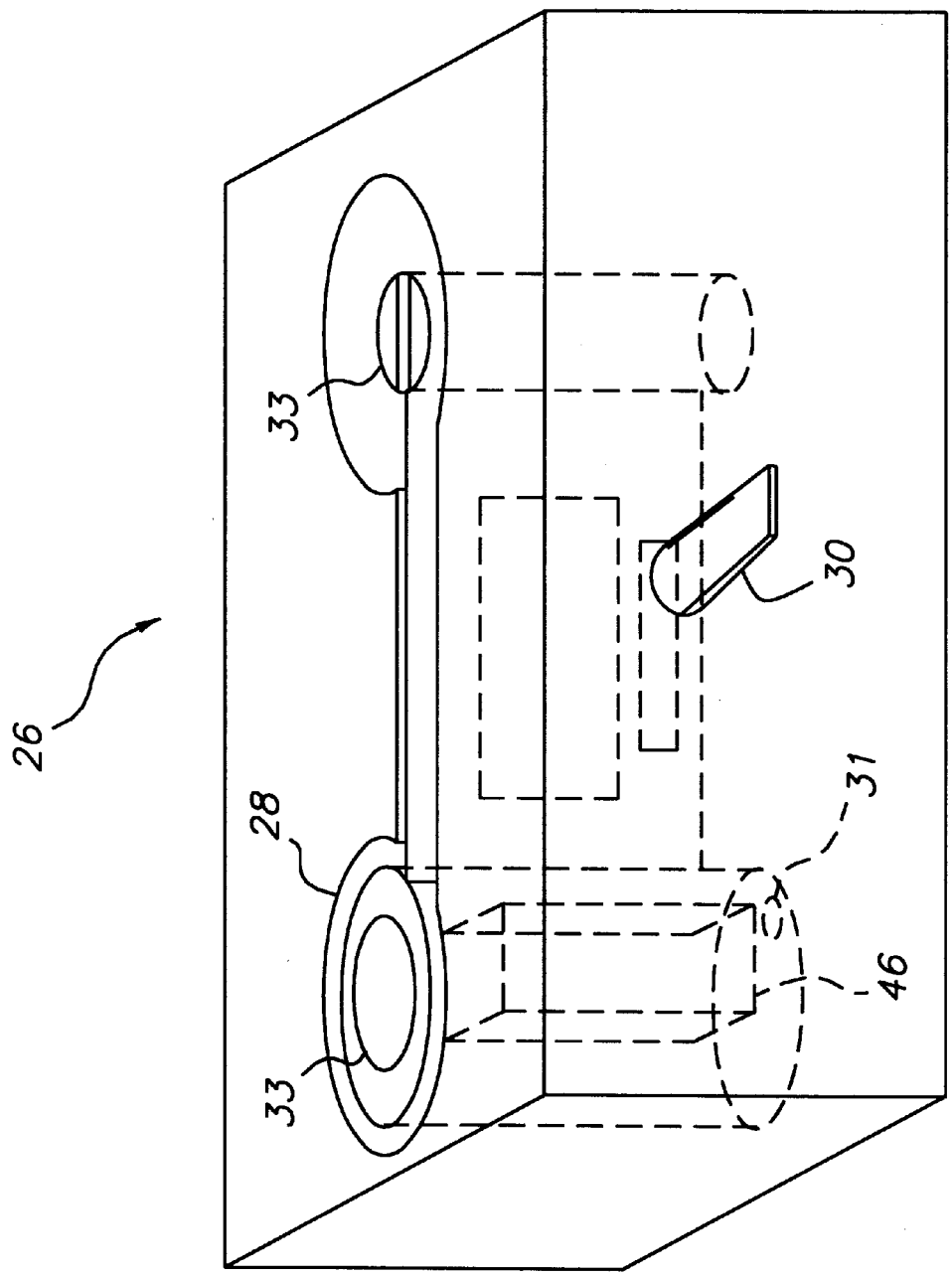
FIG. 4 is a semi-diagrammatical perspective view of the film unit holder of an embodiment of the invention usable with the film unit of FIG. 3.

The film image sequencer 10 includes a film unit holder 26 having a mount 28 for the film unit 12 and a recording unit 30 disposed to write to the digital memory store 20 of a film unit 12 disposed in the mount 28 of the film unit holder 26. The film unit holder 26 can be free-standing, or attached to the input unit 32 of the film image sequencer 10 (discussed in greater detail below), or can be attached to or incorporated in a presentation device 22 such as a projector or film scanner. The recording unit 30 (illustrated diagrammatically in FIG. 4 as a spatulate read-write head) includes one or more mechanisms necessary to access the digital memory store. For example, the recording unit can include one or more heads for reading and writing digital information. In a currently preferred embodiment of the invention, the film unit is a processed APS cartridge. In that embodiment, the mount 28 receives the film cartridge 12a and includes an active light lock opener 31 and a film drive 33. One or more magnetic heads of the recording unit 30 are disposed to operate on the mounted film cartridge 12a.

Figure 6:
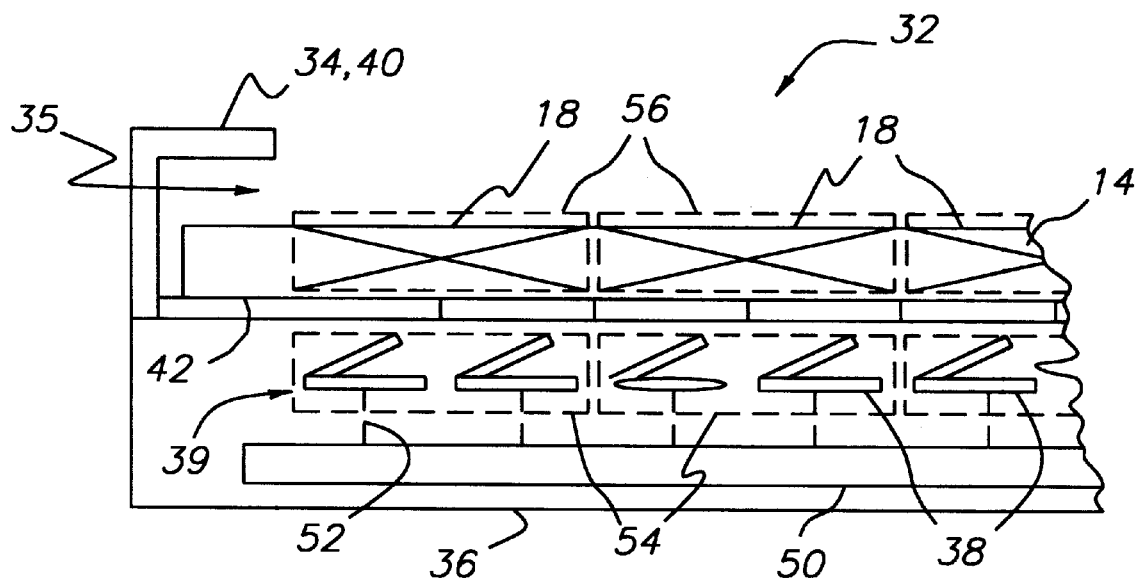
FIG. 6 is a semi-diagrammatical partial cross-sectional view of the index print station of the apparatus of FIG. 5.

The input unit 32 of the film image sequencer 10 includes an index print station 34 and a signal generator or image sequencer 36 (shown in FIG. 6). The index print station 34 has a receiver or recess 35 for the index print 14. Referring now to FIG. 6, the signal generator 36 has an array 39 of switches 38 that are closely adjacent the receiver 35 of the index print station 34. The receiver 35 is configured to receive an index print 14 in a predetermined alignment with the switch array 39, such that the imagettes 18 of the index print 14 overlap the switches 38.

Figure 5:
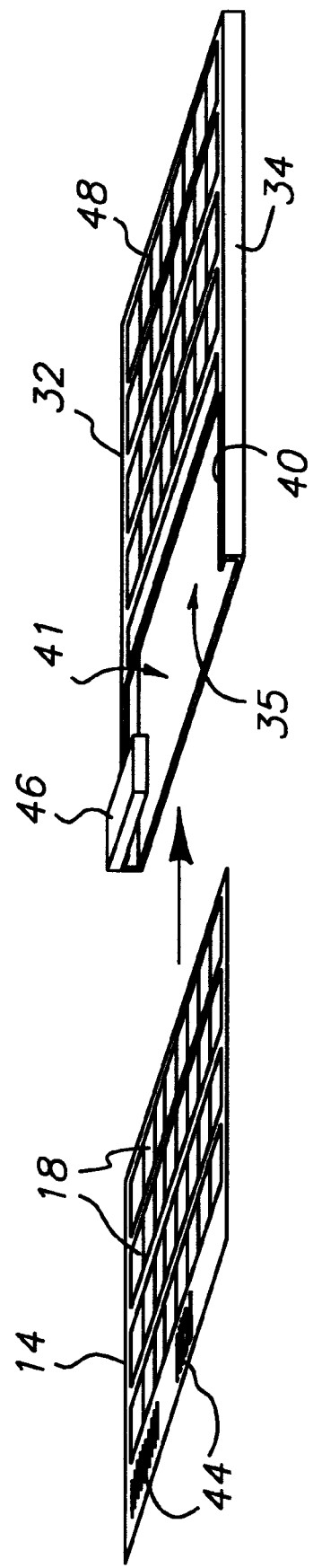
FIG. 5 is a perspective view of the input unit of another embodiment of the apparatus of the invention. The direction of index print loading is indicated by an arrow.
Figure 7:
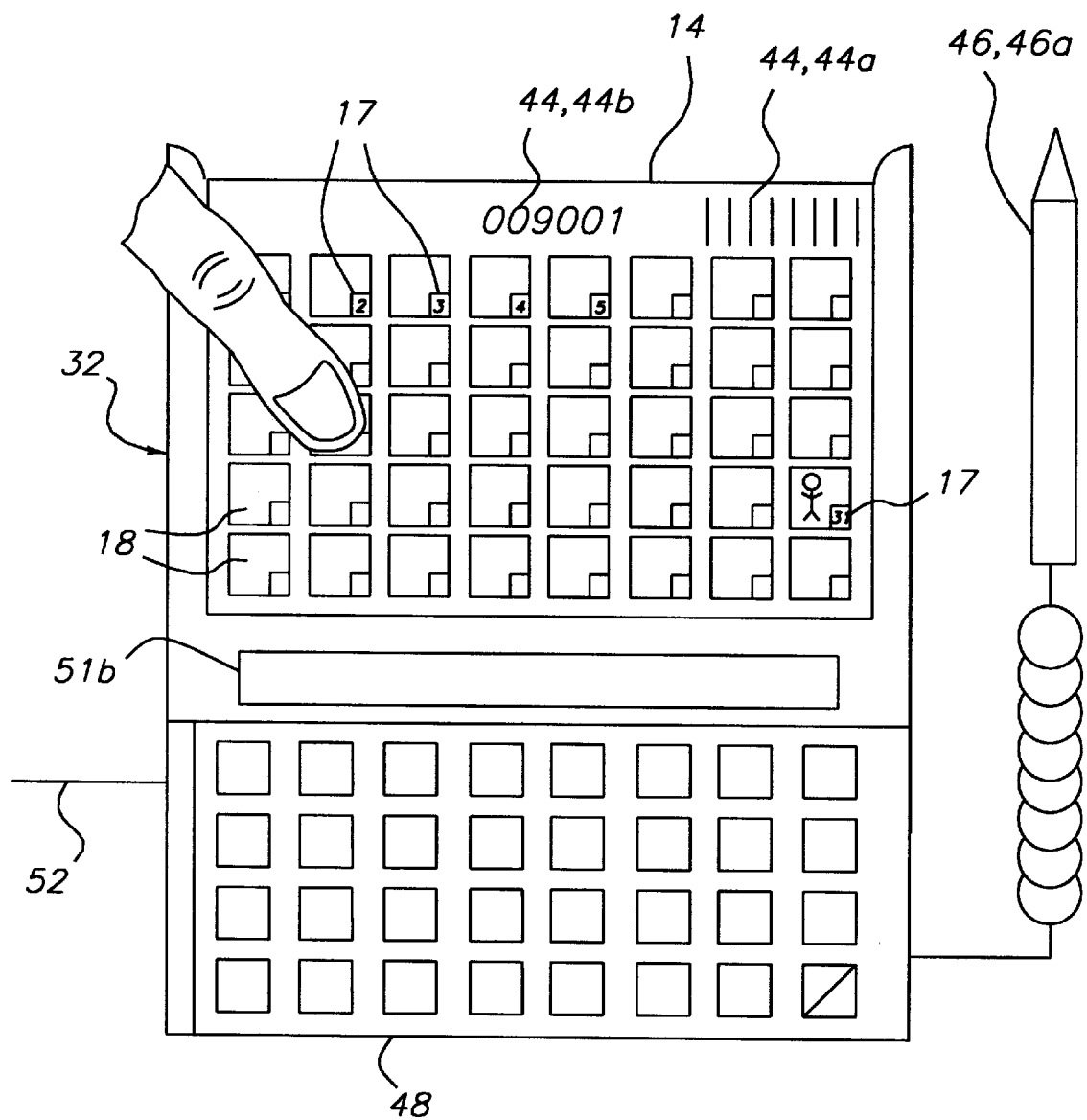
FIG. 7 is a top plan view of the input unit of the apparatus of FIG. 1. Representative imagette image content and imagette numbers are shown.

Referring now to FIGS. 5–7, in some embodiments of the invention, the input unit is configured for use with index prints 14 made on only one size of paper or transparency media. The receiver 35 is sized to loosely retain the index print 14 in a substantially invariant relation to the array of switches 38. The index print 14 is movable, within the receiver 35 in directions parallel to the longer dimensions of the index print, by a distance that is a small fraction of the dimensions of an individual imagette in the same directions. The depth of the receiver in a direction parallel to the thickness of the index print is not critical. For example, in the embodiment shown in FIGS. 5–7, the receiver 35 is a slot having a thickness slightly larger than that of an index print 14, bordered by spaced apart upstanding flanges 40 positioned to contact or closely border the margins of the index print 14. At one end the flanges define a narrow, rectangular index print entrance 41. The receiver can have a set-back or cut-away portion (not shown) adjoining the entrance to allow the user to easily grip a portion of the index print for loading and unloading. The receiver of the index print station is not limited to a slot, but can instead be a recessed area, physically delineated part of the surface of the index print station, or an interior defined by a movable part of the index print station.

Figure 8:
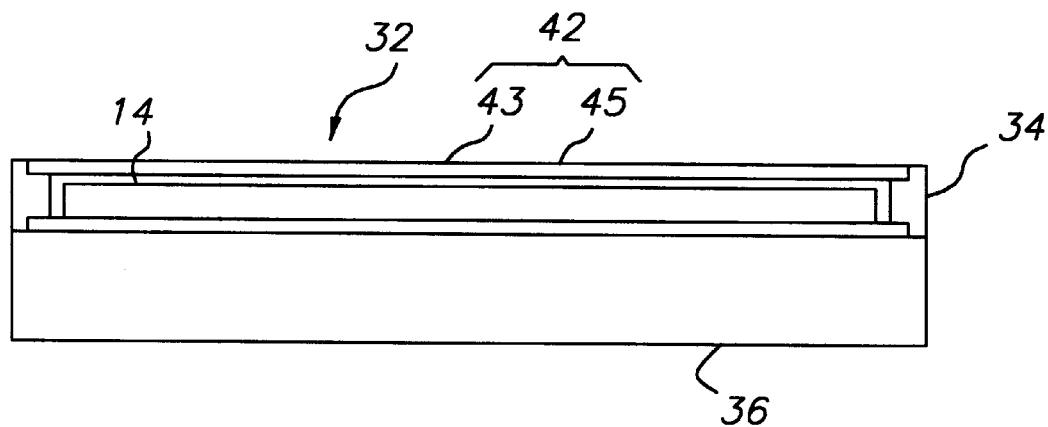
FIG. 8 is a cross-sectional view of the index print station of another embodiment of the apparatus of the invention. Some dimensions in this and other figures are exaggerated for clarity.

Referring again particularly to the embodiment of the invention shown in FIGS. 5–7, the input unit 32 has a platen 42 that underlies the receiver 35. The platen closely adjoins and has major dimensions parallel to the major dimensions of the receiver 35. The platen 42 is aligned with the receiver 35 such that there is at least a partial overlap between the platen 42 and every imagette 18 of an image print 14 resting in the receiver 35. As shown in FIG. 8, the platen 42 can have two parallel sub-units 43,45 which sandwich the receiver 35. The upper sub-unit 43 is transparent so that the imagettes are all freely viewable within the receiver 35. It is preferable that the platen 42, and the receiver 35, be planar or substantially planar, since greater curvature would make it more difficult to simultaneously view all of the imagettes of an index print.

In using the film image sequencer 10, a film unit 12 and index print 14 must first be matched to each other. This matching can be provided by the user based on physical association or commonality of images on a film unit 12 and index print 14. It is preferred, however, that the film image sequencer 10 be capable of matching identifiers 44 on a film unit 12 mounted in the film unit holder 26 and on an index print 14 resting in the receiver 35 of the index print station 34. The term "identifier" and similar terms are used herein to refer to a group of alphanumeric characters or other indicia usable for identification purposes. The nature of the matching provided and the necessary features of the film image sequencer 10 are dependent upon the identifiers 44 present or absent from the film unit 12 and index print 14, when received by the user from a film processor.

The film unit 12 and index print 14 can each bear machine readable identifiers 44a. This is ordinarily the case, for processed APS film and associated index prints. The cartridge 12a and an associated index print 14 each bear the same identification number in machine and human readable form 44a, 44b. The machine readable identification numbers are bar codes. A particular identification number is unique or substantially unique to the particular film cartridge 12a and index print or prints 14. A film image sequencer 10 adapted to match such film units 12a and index prints 14 has read elements 46 disposed for reading machine readable identification numbers 44 on the film unit 12 and index print 14, respectively. The read elements 46 can be permanently mounted, as shown in FIG. 5, facing a predetermined portion of the film unit mount 28 or receiver 35, in which case, no user action is required for matching. One or both read elements 46 can also be mounted such that a user is required to take an action, such as relative positioning of reader 46 and film unit 12 or index print 14, in order to match identification numbers 44. For example, the read element 46 for an input unit 32 can be a bar code reading wand 46a attached a flexible cable. This element 46a requires the user to swipe the index print identification bar code 44. The two read elements 46 each generate an identification signal responsive to the respective identifiers 44. The signals are each transmitted to a controller 50 and are compared. (Signal paths 52 transmit signals between the controller 50 and other components) An indication of matching or non-matching can be provided to the user by means of a display 51 or other output device operatively connected to the controller 50. The controller 50 is a computing device capable of handling the computing operations discussed in this application. The controller can utilize a digital microprocessor and can be incorporated in one of the components, as shown in FIG. 6, or can be a freestanding unit, such as a suitably programmed microcomputer, as shown in FIG. 1. A display 51a can be provided with a separate controller 50 or a display 51b can be provided as a part of the input unit 32, or both.

The comparison of the signals to determine "matching" or "nonmatching" can be, in effect, a determination of whether represented indicia are identical. The comparison is not, however, limited to matching-up identical values, but rather covers correlation procedures generally. For example, identifiers on the film unit and index print can differ in a predetermined manner, and the comparison can utilize a look-up table or first modify one or both identifiers using mathematical formulas, before analyzing for sameness. Similarly, identifiers on a film unit and pair of associated index prints can match both prints to the film unit; and, in addition, can match the collection of imagettes on each index print to a respective set of image frames in the film unit.

Alternatively, the film unit 12 can bear a machine readable identifier while the index print 14 only bears a human readable identifier. For this situation, the input device 32 can be provided with an input keypad 48 to allow the user to key in the identification number, which is then converted to an identification signal. The controller 50 then compares identification signals as previously described.

If the film unit 12 lacks a machine readable identifier, then an identifier for the film unit can be keyed in by the user from a human readable identifier. The read element 46 of the film unit holder 26 can include a writer (not separately illustrated) to write an identifier on the film unit 12, at that time. A similar approach applies if no identifier is provided associating a film unit 12 and index print 14. The user can key in an identifier or the controller can generate an identifier, which can then be written to the film unit 12. The recording of the identifier on the index print 14 can be a manual step in which the identifier is signaled to the user, who then manually writes the identifier on the index print 14. This is inconvenient for a variety of reasons, including that it is difficult to write on the front surface of an ordinary index print 14. Index prints 14 could be modified for this purpose, but this approach would remain cumbersome. A more convenient alternative is providing a writer (not separately illustrated) in the read element 46 of the input unit 32. The writer could be a magnetic or optical recording head or printer positioned to write on an area of recordable media provided on an index print or writing on a separate piece of tape or other media (not shown) for transfer to the index print.

A particular film image sequencer of the invention can include identifier matching features necessary for one or more of the above approaches or can combine features of different approaches.

Referring again to FIG. 6, the switches 38 adjoin the platen 42 and are actuable through the platen 42. Each switch 38 can produce a unique signal responsive to actuation of the switch 38. The platen 42 can be flexible or otherwise configured so as to permit switch actuation. The platen 42 is illustrated in the figures as a membrane or pair of membranes; however, the platen need not be a continuous element. The platen can be a series of discrete, individually movable levers or keys (not shown).

Figure 10:
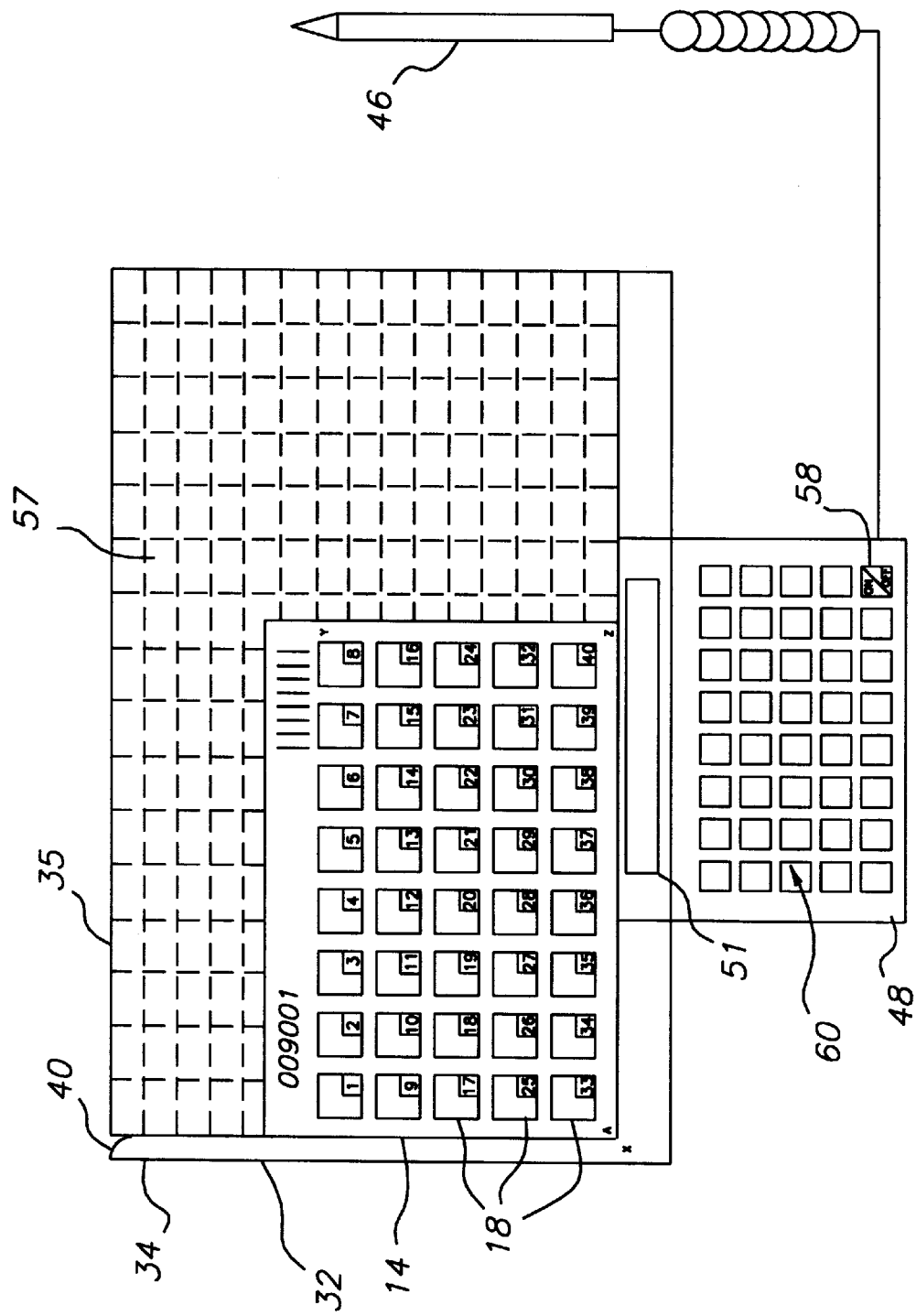
FIG. 10 is a top plan view of the input unit of another embodiment of the apparatus of the invention.

For a presentation to be programmed, the switch array 39 must be correlated with the index print 14. (Prior to that correlation, an index print 14 and film unit 12 are loaded in the index print station 34 and film unit holder 26, respectively, and matched as previously discussed.) In the correlation, the signals from the individual switches 38 are grouped to define an array 55 of triggers 54 and an array 57 of adjacent sites 56 on the platen 42. (The platen site array is shown in FIGS. 1 and 10 by dashed lines.) Each site 56 adjoins, on a one-to-one basis, the respective imagette 18 (symbolized in FIG. 6 by an elongate "X"). Each trigger 54 includes at least one switch 38. The switch or switches 38 for each trigger 54 are actuable in the immediate vicinity of the respective site 56. A trigger 54 can include a single physical switch 38, which is actuated to provide the signal for that trigger 54 or can include a number of adjacent switches 38, any of which can be actuated to provide a signal. A trigger 54 can also be a combination of two or more physical switches 38, which must be actuated in combination to provide a signal for that trigger 54. Suitable software, or devices, or a combination of the two, for grouping the switches is well known to those of skill in the art.

The operating principle of the switches 38, and how the switches 38 are actuated in the immediate vicinity of respective sites 56, is not critical. For example, the switches 38 can be mechanical pressure switches, or optical or other sensors, or elements of a touch sensitive screen. In the latter case, the platen can be part of a larger touch sensitive screen assembly. The array of switches 39 can overlie or underlie the receiver 35. In the former case, the switch array 39 needs to be transparent or substantially transparent so as to allow viewing of the imagettes 18. In a particular embodiment of the invention, the switches 38 are individual pressure sensitive switches or areas of touch screen which are actuated either by pressing on a platen site 56 directly over a respective imagette 18 or by pressing indirectly on the platen 42, by first pressing on a respective imagette 18 overlying a platen site 56. If desired, a protective member (not shown) can overlie an otherwise uncovered index print 14 to protect against damage.

The triggers 54 are subject to actuation in a non-predetermined sequence, i.e. a user determined sequence. The signal generator 36 produces a sequence signal responsive to the trigger actuations in the sequence. The recording unit 30 is operatively connected to the signal generator 36 by signal paths 52 and a controller 50 so as to record data responsive to the sequence signal in the digital memory store 20. Details of signal generation, transmittal and recording are well known to those of skill in the art. For example the signal generator 36 and recording unit 30 can be input and output devices connected by conductors or wireless signal transmitter to a controller in the form of a microprocessor based computing device, such as a personal computer, and the sequence signal and recorded data can utilize software protocols utilized for data transfer and storage. The microprocessor can be incorporated in the film image sequencer 10, or can be a discrete device, or part of some other mechanism, such as a programmable film projector or other imaging display device. For reasons of economy, it is generally preferred that the same controller be used for all the various functions discussed here; however, separate dedicated controllers could be provided.

The index prints currently provided by film processors commonly vary the number of imagettes on a single index print as an inverse function of the nominal frame count of a processed filmstrip. Imagettes 18 thus do not necessarily have a single fixed size. This can be dealt with by limiting a particular film image sequencer 10 to index prints 14 having imagettes 18 in a single type of array having predetermined imagette sizes and locations. In this case, sites on the platen 42 are fixed and the trigger array 55 is predetermined, such that correlation of triggers 54 to platen sites 56 occurs automatically as an index print 14 is loaded into the receiver 35.

Figure 9A:
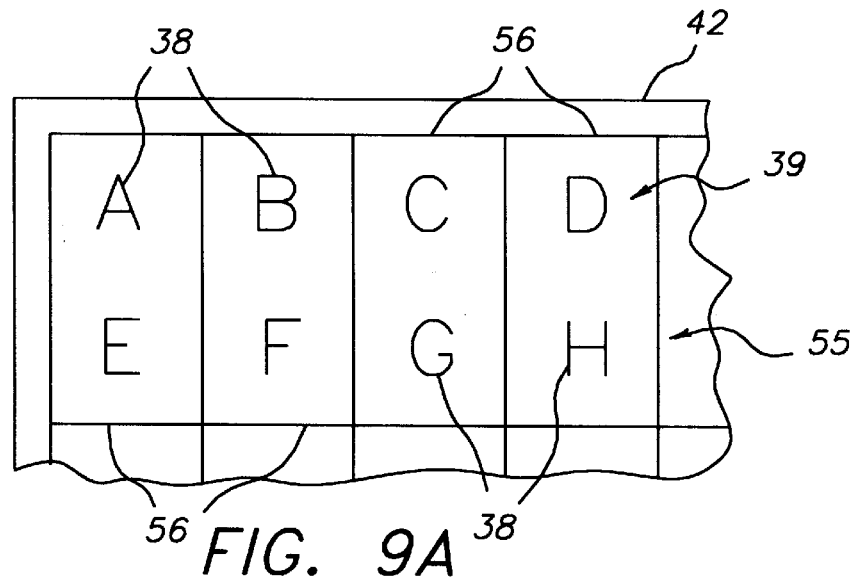
FIGS. 9A–9C are semi-diagrammatical partial top plan views of the index print station of the apparatus of FIG. 1, with differently arranged index prints.
Figure 9B:
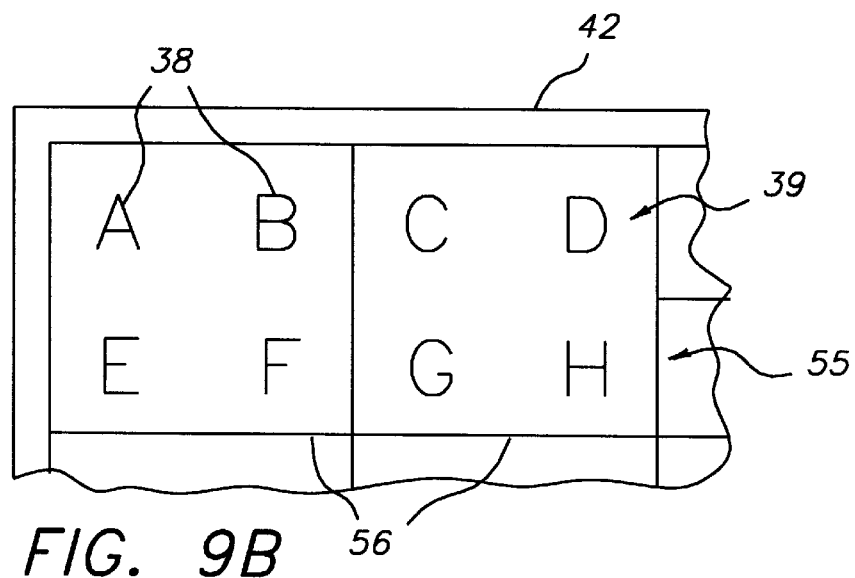
Figure 9C:
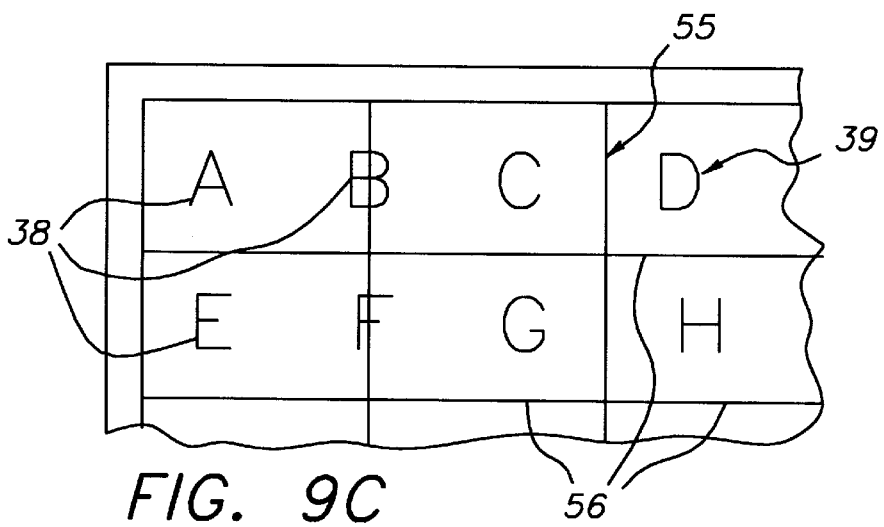

A particular film image sequencer 10 can instead be limited not to a single imagette array, but rather a series of predetermined imagette arrays. In this case, triggers 54 and platen sites 56 are likewise predetermined, at on an alternate basis. Simplified examples are shown in FIGS. 9A–9C. Switches 38 of the array 39 are symbolized by letters. Each platen site 56 (indicated by a rectangle) overlaps a single switch 38 or combination of switches 38. Triggers have dimensions corresponding to the platen sites; but, for clarity, are not shown. In FIG. 9A, platen sites 56 each overlap a single switch 38 and the site and trigger arrays 57,55 correspond to the switch array 39. In FIG. 9B, platen sites 56, and corresponding triggers, each overlap four switches 38. Redundant switches can be ganged or deactuated, either physically or by means of software. Similarly, as shown in FIG. 9C, platen sites 56 can overlap switches 38, such that the trigger for each imagette is defined by a unique pair of switches, but individual switches may be actuated for more than one trigger. A hardware or software switch can be provided to allow switching among the members of the series of predetermined imagette arrays.

In a particular embodiment of the invention, the film image sequencer 10 is not limited to one or a series of predetermined imagette arrays. In this embodiment, the film image sequencer 10 maps a trigger array in response to an array size signal. Such a signal can be generated from information recorded at the time of film processing and later read by a read element 46 used to obtain other information from the index print, or can be generated by the user, or can be generated by a combination of the two. In a currently preferred embodiment of the invention shown in FIG. 10, the user first seats the index print 14 in the index print station 34. The receiver 35 can be oversized to accommodate index prints in multiple sizes. The index print 14 is abutted against flanges 40 on two sides such that a comer (not shown in FIG. 10) occupies the location indicated in FIG. 10 by "X". The user then inputs imagette array parameters by actuating switches defining lower left, and upper and lower right boundaries of the imagette array, indicated in FIG. 10 by "A", "Y", and "Z", respectively. The user also inputs the number of imagettes in each column and row; for example, by typing in the numbers on a keypad 48. The imagette array information can be retained for reuse in the digital memory store 20 of the film unit 12.

The input unit 32 can include a variety of convenience controls and features, such as a power on-off switch 58. A common switch can be provided for both the input unit 32 and the recording unit 30. In a particular embodiment of the invention, the power on-off switch 58 can also be actuated and deactuated by inserting and removing an index print 14. A timer can be provided to automatically deactuate the power switch after period of non-use. The input unit 32 can include lighting (not shown) for the index print 14 and lighting controls can be provided.

In a preferred embodiment of the invention, the input unit 32 includes editing controls 60 in addition to the sequence and other controls previously discussed. The editing controls 60 can be provided as part of the keypad 48. X-y movement devices such as a joystick or trackball can also be provided. The keypad or control panel 48 can have one or more convenience controls such as a separate on-off switch 58 for deactuation to prevent inadvertent use during image frame sequencing. The control panel 48 can be joined to the index print station 34 for ease of transport and storage or can be separate to allow the user greater latitude in placement of the portions of the input unit 32. The control panel can provide dedicated keys or other input devices for particular functions or can utilize general purpose computer peripherals, such as keyboards and other input devices along with appropriate software. Suitable devices and software are well known to those of skill in the art.

The sequencer 10 can be configured to have the display 51 indicate recent user actions and present messages to the user. A moderate size liquid crystal display disposed on a structural member extending between the index print station and the control panel is convenient. The display can be lighted and otherwise configured for user convenience. In a particular embodiment of the invention, the display can show a grid of numbered cells representing the imagettes of an index print 14 in the index print station 34. The grid representation can change to show sequence numbers and other information.

The control panel can provide two general classes of commands: commands to the controller related to preparation and recording of a particular presentation program on a film unit and commands comprising image manipulation instructions for inclusion in a presentation program recorded on a particular film unit. Examples of presentation commands include: start recording a program in temporary memory, restart or clear a program from temporary memory, write a program from temporary memory to a film unit, restart, repeat an earlier image or partial sequence of images, randomize the sequence for a series of images, start an additional program for the same film unit, and deliver additional control instructions to a presentation device, for example, instructing a projection system to dim room lights or start a second presentation.

Image manipulation instructions modify the treatment of a projected image by the presentation device. Useful instructions for a particular film unit are limited by the image modification features available on the presentation device or presentation devices with which the film unit is intended to be used. A particular film image sequencer can provide generalized functions or can be limited for use with a particular presentation device or class of devices, or available features can be varied by the user by software command or the like. Examples of the classes of manipulations that can be provided include: zooming, cropping, re-centering, orienting, formatting, and filtering. These manipulations are very desirable for presentations to audiences, i.e., slide shows; but also useful for presentations to image scanners and the like. Image manipulation prior to scanning can save time and improve resolution relative to an image scanned and then digitally manipulated.

The film image sequencer 10 can be provided in a single housing or can be divided between several housings. Other components such as a presentation device, can be combined with one or more of the housings. For example, the film unit holder can be provided in a common housing with a slide projector and the film holder and slide projector can share a common read-write head.

The invention is not limited to any particular type of signal paths between the various components. The components can be hard wired together or can be connected by wireless means such as infrared data communication linkages. Components can be connected via a computer network through modem connections by dedicated or shared network lines. Signal paths can provide for real-time or delayed data transmission. Communication between components can be provided on a delayed basis by storing information on a data storage medium, such as computer disk.

Figure 11:
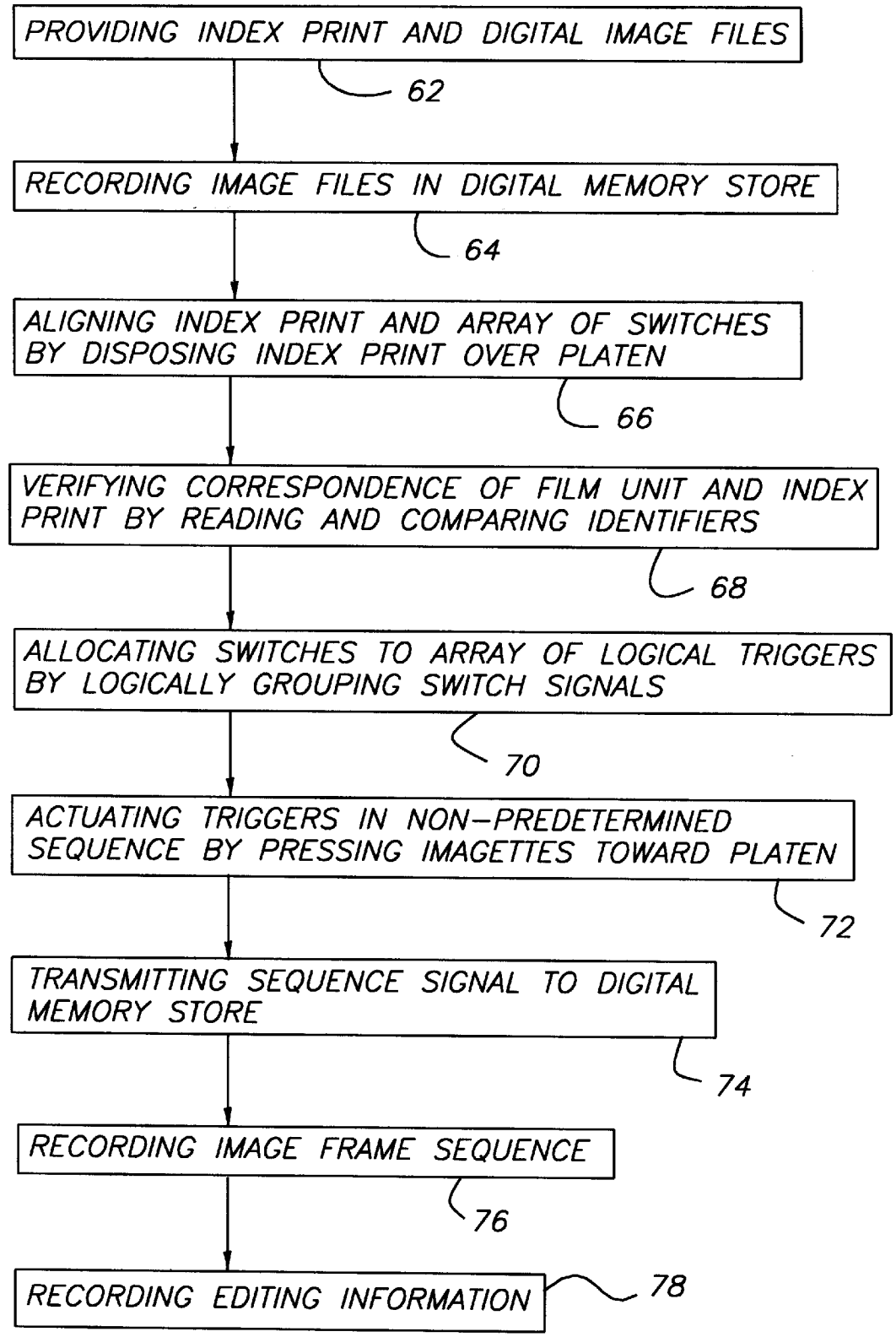
FIG. 11 is a flow-chart of the method of the invention.

Referring now to FIG. 11, the method of the invention for sequencing film image presentations has the following steps. The method begins by providing (62) a film unit 12 and an image print. The film unit 12 has a digital memory store 20 and a plurality of image frames. The index print 14 has an array of imagettes corresponding to the image frames of the film unit 12. The film unit 12 is loaded (66) in a film unit holder 26, which has a mount 28 for a film unit 12 and a recording unit 30 disposed to write to the digital memory store 20 of a film unit 12 disposed in the mount. The index print 14 is loaded (64) on a platen 42 of an index print station 34 such that the index print 14 and an array of switches of the index print station 34 are disposed in overlapping relation. Correspondence of the film unit 12 and index print 14 is verified (68). The film unit 12 and the image print can each have a machine readable identifier. In that case, the film unit 12 and index print 14 can be matched by reading and comparing the identifiers 44. The index print 14 and the array 39 of switches 38 are correlated (70) by allocating the switches 38 to an array 55 of triggers 54, thus defining an array 57 of adjacent sites 56 on the platen 42. In the correlation, the switches 38 are grouped such that the array 55 of triggers has at least one trigger 54 associated with each imagette 18 and the triggers 54 each include at least one switch 38. The switches 38 of each trigger 54 are actuable from the immediate vicinity of a respective imagette 18. The triggers 18 are then actuated (72) in a non-predetermined; that is, user determined; sequence. In actuating the switches, the respective imagettes 18 are simultaneously denoted by the user, preferably by pressing on the platen site 56 for a respective imagette 18 (as illustrated in FIG. 7). A sequence signal responsive to the sequence of trigger actuations is transmitted (74) to the recording unit 30, which in response, records (76) data representing the sequence of an image frame presentation corresponding to the sequence of trigger actuations. Editing information for individual images is transmitted and recorded (78) in the same manner.

The invention has been described in detail with particular reference to certain preferred embodiments thereof, but it will be understood that variations and modifications can be effected within the spirit and scope of the invention.

PARTS LIST film image sequencer 10
film unit 12
film unit-film cartridge type 12a
film unit-slide tray type 12b
index print 14
image frames 16
imagettes 18
numbers 17
slides 19
digital memory store 20
slide tray 21
presentation device 22
filmstrip 23
support structure 24
film unit holder 26
mount 28
recording unit 30
active light lock opener 31
input device 32
film drive 33
index print station 34
receiver 35
signal generator 36
array of switches 38
flanges 40
index print entrance 41
platen 42
platen sub-unit 43
identifiers 44
machine readable identifier 44a
human readable identifier 44b
platen sub-unit 45
read elements 46
bar code reading wand 46a
input keypad 48
controller 50 display 51
separate display 51a
incorporated display 51b
Signal paths 52
triggers 54
array of triggers 55
site 56
array of sites 57
power on-off switch 58
editing controls 60
providing a film unit (62)
aligning index print and switch array (64)
registering film unit in holder (66)
matching film unit and index print (68)
allocating switches to trigger array (70)
actuating triggers (72)
transmitting sequence signal (74)
recording sequence data (76)
recording editing data (78)

What is claimed is:

1. A method for sequencing a film image presentation, comprising the steps of:
   providing a film unit having a digital memory store and a plurality of image frames, and an index print having an array of imagettes corresponding to said image frames of said film unit;
   aligning said index print and an array of switches, wherein said array of switches has at least one switch in registry with each said imagette;
   allocating said switches to an array of triggers, said triggers each having a uniquely associated imagette, said triggers each including at least one switch in registry with said imagette, said array of triggers having at least one trigger associated with each of said imagettes;
   actuating switches of a plurality of said triggers in a non-predetermined sequence to define a sequence of imagettes associated with respective said triggers;
   recording in said digital memory store a sequence of image frames corresponding to said sequence of imagettes.

2. The method of claim 1 wherein said actuating step further comprises actuating each said trigger from the immediate vicinity of a respective said imagette.

3. The method of claim 1 further comprising, prior to said recording; registering, in operative relation, said digital memory store and a recording unit for said digital memory store.

4. The method of claim 1 further comprising verifying correspondence of said film unit and said image print.

5. The method of claim 4 wherein said film unit and said image print each have machine readable identifiers and said verifying step further comprises reading said identifiers.

6. The method of claim 1 wherein each said switch is actuable to produce a unique switch signal and said allocating step further comprises logically grouping said switch signals.

7. The method of claim 1 wherein said allocating step further comprises allocating said switches to a trigger array selected from a predetermined plurality of trigger arrays.

8. The method of claim 1 further comprising mapping said array of imagettes to said array of switches.

9. The method of claim 1 wherein said aligning step further comprises disposing said index print over a platen and said actuating step further comprises actuating switches of a plurality of said triggers in a non-predetermined sequence by pressing imagettes associated with respective said triggers toward said platen.

10. The method of claim 1 further comprising recording in said digital memory store image editing information for said image frames.

11. The method of claim 1 wherein said film unit is a thrust-type film cartridge and said digital memory store is a magnetically recordable layer of a filmstrip disposed in said film cartridge.

12. The method of claim 1 wherein said film unit is a slide tray bearing a plurality of slides.

13. The method of claim 12 wherein said slides each have a segment of filmstrip and a mount and said digital memory store comprises said slide mounts.

14. A method for sequencing a film image presentation, comprising the steps of:
   providing a film unit having a digital memory store and a plurality of image frames, and an index print having an array of imagettes corresponding to said image frames of said film unit;
   aligning said index print and an array of switches, wherein said array of switches has at least one switch in registry with each said imagette;
   allocating said switches to an array of logical triggers, said triggers each having a uniquely associated imagette, said triggers each including at least one switch in registry with said imagette, said array of triggers having at least one trigger associated with each of said imagettes;
   manually denoting said imagettes in a non-predetermined sequence;
   actuating said switches of said triggers associated with said imagettes responsive to said denoting to generate a sequence signal;
   transmitting said sequence signal to said digital memory store; and
   recording in said digital memory store a sequence of image frames corresponding to said sequence of imagettes responsive to said sequence signal.

15. A film image sequencer, for use with a film unit having a digital memory store and a plurality of image frames, and an index print having an array of imagettes corresponding to the image frames of the film unit, said film image sequencer comprising:
   an index print station having a receiver for said index print, said receiver being configured to receive an index print in a predetermined alignment;
   a platen closely adjoining said receiver, said platen having an array of sites corresponding on a one-to-one basis to imagettes on the index print;
   and a signal generator having a array of switches adjoining said platen, said switches being disposed such that at least one switch is associated with each of said sites and is actuable from the immediate vicinity of the respective said site, said switches being subject to actuation in a non-predetermined sequence, said signal generator producing a sequence signal responsive to said actuations in said sequence,
   a film unit holder having a mount for a film unit and a recording unit disposed to write to the digital memory store of a film unit disposed in said mount, said recording unit being operatively connected to said signal generator for recording data in said digital memory store responsive to said sequence signal.

16. The film image sequencer of claim 15 wherein said signal generator includes means for allocating said switches to an array of logical triggers, said triggers each having a uniquely associated imagette, said triggers each including at least one switch in registry with said imagette, said array of triggers having at least one trigger associated with each of said imagettes.

17. The film image sequencer of claim 16 wherein said means for allocating further comprises means for allocating said switches to a trigger array selected from a predetermined plurality of trigger arrays.

18. The film image sequencer of claim 16 wherein said means for allocating further comprising means for mapping said array of imagettes to said array of switches.

19. The film image sequencer of claim 15 wherein said film unit and said index print each bear an identification code, said identification code uniquely identifying said film unit and index print and said film image sequencer includes means for comparing said identification codes of said film unit and said index print.

20. The film image sequencer of claim 19 wherein said index print identification code is machine readable and said signal generator includes an identification code reader disposed in operative relation to said index print receiver.

21. The film image sequencer of claim 15 wherein said index print station includes a plurality of editing controls operatively connected to said recording unit for recording editing data in said digital memory store.

22. The film image sequencer of claim 15 wherein said recording unit is adapted to record on a magnetically recordable layer of a filmstrip disposed in a thrust-type film cartridge.

23. The film image sequencer of claim 15 wherein said film unit holder is adapted for use with a slide tray bearing a plurality of slides.

24. The film image sequencer of claim 23 wherein said slides each have a segment of filmstrip and a mount and said recording unit is adapted for use with magnetically recordable slide mounts.

* * * * *